(12) United States Patent
Tettenborn

(10) Patent No.: US 11,872,958 B2
(45) Date of Patent: Jan. 16, 2024

(54) STORAGE COMPARTMENT AND ASSEMBLY

(71) Applicant: Faurecia Innenraum Systeme GmbH, Hagenbach (DE)

(72) Inventor: Sebastian Tettenborn, Heidelberg (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 350 days.

(21) Appl. No.: 16/949,140

(22) Filed: Oct. 15, 2020

(65) Prior Publication Data
US 2021/0114527 A1    Apr. 22, 2021

(30) Foreign Application Priority Data
Oct. 17, 2019    (DE) ...................... 10 2019 216 049.2

(51) Int. Cl.
| | |
|---|---|
| B60R 7/04 | (2006.01) |
| B29K 23/00 | (2006.01) |
| B29L 31/30 | (2006.01) |
| B29K 83/00 | (2006.01) |
| B29C 45/16 | (2006.01) |

(52) U.S. Cl.
CPC ................ B60R 7/043 (2013.01); B60R 7/04 (2013.01); B60R 7/046 (2013.01); *B29C 45/16* (2013.01);
(Continued)

(58) Field of Classification Search
CPC ............ B60R 7/043; B60R 7/04; B60R 7/046
(Continued)

(56) References Cited

U.S. PATENT DOCUMENTS

| | | | | |
|---|---|---|---|---|
| 3,088,771 A | * | 5/1963 | Weigle ...................... | B60N 3/08 |
| | | | | 224/928 |
| 5,505,358 A | * | 4/1996 | Haase ....................... | B60R 7/02 |
| | | | | 224/404 |

(Continued)

FOREIGN PATENT DOCUMENTS

| | | |
|---|---|---|
| DE | 102016207096 A1 | 11/2016 |
| DE | 102019101800 A1 | 8/2019 |
| WO | WO-2008008614 A2 | 1/2008 |

OTHER PUBLICATIONS

"German Application Serial No. 10 2019 216 049.2, Office Action dated Jun. 10, 2020", (Jun. 10, 2020), 7 pgs.

*Primary Examiner* — Jason S Morrow
(74) *Attorney, Agent, or Firm* — Schwegman Lundberg & Woessner, P.A.

(57) ABSTRACT

Disclosed is a storage compartment, in particular a storage compartment for a vehicle, comprising a cover flap which is connected to a carrier panel such that a storage space can be formed between the carrier panel and the cover flap, wherein the cover flap comprises at least two segments and each of the segments is connected to at least one other of the segments movably about a respective axis, wherein the cover flap is movable, by pivoting the segments, between a stable first position and a stable second position, in which the storage space is enlarged compared to the first position. When the cover flap assumes an instable third position between the first position and the second position, is subjected to a force in the direction of the first position or in the direction of the second position. The application further relates to an assembly which includes the storage compartment.

13 Claims, 4 Drawing Sheets

(52) U.S. Cl.
CPC ...... *B29K 2023/12* (2013.01); *B29K 2083/00* (2013.01); *B29L 2031/3041* (2013.01)

(58) Field of Classification Search
USPC ................. 296/37.8, 37.13, 37.15, 37.16
See application file for complete search history.

(56) References Cited

U.S. PATENT DOCUMENTS

| | | | |
|---|---|---|---|
| 5,795,005 | A | 8/1998 | Garfias et al. |
| 5,881,934 | A * | 3/1999 | Hung ...................... B60R 7/043 |
| | | | 190/902 |
| 6,047,879 | A * | 4/2000 | Henrikson ................ B42F 7/08 |
| | | | 229/72 |
| 6,623,060 | B2 * | 9/2003 | Gehring .................... B60R 7/02 |
| | | | 296/37.16 |
| 7,654,402 | B2 * | 2/2010 | Kusuma ............... B65D 21/086 |
| | | | 220/666 |
| 8,061,550 | B2 * | 11/2011 | Browne .................. B60R 7/005 |
| | | | 220/666 |
| 10,363,878 | B1 * | 7/2019 | Lee .......................... B60R 7/046 |
| 11,414,019 | B2 * | 8/2022 | Höppel et al. ......... B60N 3/102 |
| 11,420,566 | B2 * | 8/2022 | Habert ...................... B60R 7/04 |
| 2004/0262352 | A1 * | 12/2004 | Sturt .......................... B60R 7/06 |
| | | | 224/311 |
| 2014/0367396 | A1 * | 12/2014 | Schmalz ................... B60R 7/04 |
| | | | 220/666 |
| 2018/0118122 | A1 * | 5/2018 | Rueda Musi ...... G07C 9/00571 |
| 2020/0361353 | A1 * | 11/2020 | Schmidt ................ B60N 3/002 |
| 2022/0379812 | A1 * | 12/2022 | Reischer ................ B60R 7/046 |

* cited by examiner

STORAGE COMPARTMENT AND ASSEMBLY

CLAIM FOR PRIORITY

This application claims the benefit of priority of German Application No. 10 10 2019 216 049.2, filed Oct. 17, 2019, which is hereby incorporated by reference in its entirety.

TECHNICAL FIELD

The application relates to a storage compartment, in particular to a storage compartment for a vehicle, for example for a vehicle seat or a door module, and further to an assembly which comprises such a storage compartment.

BACKGROUND

Numerous examples of storage compartments for vehicles, in particular for interiors of vehicles, are known from the state of the art. Known storage compartments, however, have various disadvantages. For instance, a storage compartment is to provide as much storage space as possible. However, the space which is available for storage compartments is often very limited in the interiors of vehicles—in particular on the one hand due to the numerous interior components which are to be taken into consideration and on the other hand due the necessity for driver and passenger comfort. At the same time, it is desirable for even a spacious storage compartment to also reliably hold smaller objects, particularly whilst the vehicle is in motion. The storage compartment should furthermore be insensitive to dirt and be robust with respect to wear and damage and should also blend into the overall appearance of the vehicle interior in a visually and haptically pleasing manner. Known storage compartments often mostly do not have such mentioned characteristics to a satisfactory degree or not in combination.

SUMMARY/OVERVIEW

An objective potential advantage on which the present disclosure is based accordingly lies in suggesting a storage compartment which avoids or reduces at least some of the mentioned disadvantages. Furthermore, an assembly with such a storage compartment is put forward.

The objective potential advantage is achieved by a storage compartment and an assembly. Advantageous embodiments and further developments of the storage compartment and of the assembly result from the features of the dependent claims.

A storage compartment of the type suggested here comprises a cover flap which is connected to a carrier panel such that a storage space can be formed between the carrier panel and the cover flap, wherein the cover flap comprises a plurality of segments and each of the segments is connected to at least one further one of the segments movably about a respective axis, wherein the cover flap is movable by pivoting the segments between a stable first position and a stable second position in which the storage space is enlarged compared to the first position.

The carrier panel may be for example a structural or decorative element on the outer side of an assembly, for example a cover or a trim part in a vehicle interior, but may also be another panel, for instance a structural or decorative element of a piece of furniture or building interior.

The cover flap may be fastened to the carrier panel along several outer edges of the cover flap or be connected to it (for example directly connected or by way of one or more support elements), for forming the storage space, wherein at least one opening remains for inserting or removing objects to be stowed. Such an opening may likewise be formed in the region of an outer edge of the cover flap, or, for example, as a slot or other opening within the surface of the cover flap.

The segments may be essentially flat and/or planar elements and may be arranged, within the cover flap, adjacently on respective adjacent or common edges in a manner bordering one another or also spaced apart from one another. The axes may be arranged between edges of adjacent segments and/or between the carrier panel and a respective adjacent edge of a segment. The axes may be arranged parallel or almost parallel to edges of adjacent segments or of the carrier panel.

In particular, the axes may be pivot axes and the segments may be pivotably connected to one another and/or to the carrier panel about the respective axes.

The fact that the first position and the second position are stable means that the cover flap does not move out of the first or the second position in the absence of an external force action, thus remains in the respective position, and further that, even given a deflection out of the respective position by an external force which does not exceed a certain threshold, the cover flap returns back again into the previous (i.e. first or second) position after the force action has ended.

It is provided that the cover flap, when it assumes an instable third position between the first position and the second position, is subjected to a force in the direction of the first position or in the direction of the second position.

The fact that the third position is instable means that the cover flap does not remain in the third position in the absence of an external force action, but—on account of the force in the direction of the first position or in the direction of the second position—is forced into the first or second position. The third position can herein be any position between the first position and the second position.

In particular, the following embodiment may be provided: if the third position lies closer to the first position than an intermediate position, then the cover flap experiences a force in the direction of the first position. If the third position, by contrast, lies closer to the second position than the intermediate position or the third position corresponds to the intermediate position, then the cover flap experiences a force in the direction of the second position. In this embodiment, the cover flap is bistable, thus has two equilibrium positions (the first and second position), between which a range of instable positions (the possible range of the third position) lies.

The storage compartment with the described features, in particular with the cover flap, which is designed as described, has various advantages. For instance, the spatial requirement of the storage compartment is particularly low when the cover flap is located in the first position. At the same time, the storage compartment with the cover flap in the first position may be particularly suitable for the secure holding of smaller objects. When required (i.e. for stowing larger objects), the storage space can be enlarged by way of bringing the cover flap into the second position. The storage compartment may furthermore blend into the overall appearance of the surroundings, thus for example of the vehicle interior, in a visually and haptically pleasing manner by way of the storage space which can be adapted in such a manner.

The storage compartment may comprise a plurality of joint elements which are elastically biasable or biased for exerting the force in a direction of the first and/or second position. Each of the joint elements may be connected to at least one segment and be movable about one of the respective axes.

In particular, each of the joint elements may be connected to two adjacent segments or to a segment and the carrier panel. The joint elements for example may be or comprise pin hinges or pivot hinges which may be biasable for example by way of a spring element.

Preferably, the joint elements may be or comprise film hinges, i. e. hinges which comprise a bendable material layer (for instance a bendable polymer layer, rubber layer and/or metal layer) and/or in whose region a material is thinned with respect to adjacent regions, for forming such a bendable material layer. The bendable material layer may have an elasticity and/or a shape memory for the biasing. The joint elements may all be of the same type, or different joint elements may be combined with one another. In particular, joint elements with a different biasing may be combined.

By way of the biasable or biased joint elements, a defined relative movement of the segments to one another and/or to the carrier panel can be ensured, and furthermore, on account of the biasing of the joint elements, one can generate the force in the direction of the first position and/or the force in the direction of the second position, thus in particular create a bistability of the cover flap in a simple manner.

At least one of the joint elements may be biasable or is biased in the direction of a preferred angle, in particular a preferred angle of 180°.

By way of the provision of a preferred angle, the force in the direction of the first position and/or the force in the direction of the second position, thus in particular a bistability of the cover flap may be produced in a particularly simple manner.

A preferred angle of 180°, at which segments which are adjacent to the respective joint element lie flat next to one another, may be implemented for example with an elastically biased film hinge of the type described above. Other preferred angles may be realised for example by way of a hinge which is biased by way of a spring element or by way of a hinge with a shape memory material. At least one of the joint elements may for example be bistable, i. e. have two preferred angles, whereby the bistability of the cover flap can also be achieved.

It may be provided that at least three of the axes intersect at a common point. Preferably, at least two sets of at least three axes may intersect at a common point.

Such an arrangement has been found to be particularly advantageous since it permits the provision of sufficient degrees of freedom of the segments for the convenient movement of the cover flap between the first and second position and at the same time allows for the bistability of the cover flap.

For example, edges of the cover flap which are connected to the carrier panel may define a middle plane. The cover flap then in a first position may be deflected out of the middle plane in a first direction which is perpendicular to the middle plane and in the second position in a second direction which is opposite to the first direction.

In this case, the cover flap has a contour line (for example an outer contour line) which is longer than a projection of the contour line onto the middle plane. The additional length must be accommodated by way of suitable degrees of freedom on moving the cover flap through the middle plane, which may be implemented in a simple manner, for example in combination by arranging the axes such that at least three of the axes intersect at a common point.

It may be provided that the cover flap comprises at least four, preferably at least five segments. It may alternatively be provided that the cover flap comprises more than five segments.

By selecting a suitable number and shape of the segments, a storage compartment design which is adapted to the use and visually pleasing can be achieved.

It may be provided that the cover flap comprises a first set of at least three axes and a second set of at least three axes. The axes of the first set may intersect at a first common point and the axes of the second set may intersect at a second common point, wherein the two points are spatially distanced.

It may be provided that at least one of the segments, preferably at least two of the segments, have a triangular shape. The triangular shape in particular is a simple way of designing the segments such that three intersecting axes may be provided.

Alternatively, at least one of the segments may only partly have a triangular shape, which means that the triangular shape relates only to edges of the segments, on which joint elements are arranged, whereas for example a region on which no joint element is arranged may have an arbitrary shape.

At least one of the segments may comprise an essentially rigid, in particular flexurally rigid material, for example a polymer, metal, glass and/or wood, or consist of this.

Advantageous characteristics of the cover flap, in particular the shape stability and/or robustness with regard to dirt and/or damage may be provided by way of the use of such a material.

An essentially rigid material may also have a certain measure of bendability, elasticity and/or flexibility. The bendability, elasticity and/or flexibility of the segments is preferably lower than that of the joint elements. Alternatively, or additionally, at least one of the segments may comprise a soft, bendable or flexible material or consist of this.

The segments may comprise an essentially rigid core which on one side or both sides may be completely or partly coated by a decorative material, for example a polymer, textile, leather or artificial leather.

The cover flap may be connected to the carrier panel by way of one or more support elements and at least in the second position may be spaced apart from the carrier panel.

By way of the provision of support elements, the provided storage space and/or a structural stability of the storage compartment can be adapted according to an envisaged use.

The cover flap may be integrally formed with the carrier panel or be formed as a separate part which is connectable to the carrier panel. The cover flap may be formed as a single part, wherein the segments may be delimited from one another by way of thinned regions. The cover flap may also be formed from separate segments which may be connected to one another by way of connection elements and/or with a material fit, for example via film hinges.

The storage compartment and/or the cover flap may be manufacturable at least partly by way of a multi-component injection moulding process, wherein the joint elements may be manufacturable at least partly in a first process cycle and/or of a first material and the segments at least partly in a second process cycle and/or of a second material.

For example, first (in the first process cycle) a continuous first material layer may be manufacturable from a flexible first material, and subsequently (in the second process cycle) a second material layer, which is interrupted for forming the segments, may be manufacturable from a rigid second material, wherein the joint elements are film hinges which are formed by the regions of the first material layer which lie between the segments. For example, a silicone or polyurethane (PU) is suitable as the first material, and for example a polypropylene (PP) or a natural fibre polypropylene (NFPP) composite material is suitable as the second material.

However, one may, for example, also first (in a first process cycle) manufacture the segments and subsequently (in the second process cycle) the joint element may be formed between the segments.

The storage compartment and/or the cover flap may also be manufacturable at least partly by way of a single-component injection moulding method, wherein the joint elements may be designed for example as regions which are thinned compared to the segments, i.e. as film hinges.

The storage compartment can be manufactured in a cost-efficient manner and in large numbers by way of such methods, wherein the joint elements can be manufactured and integrated in a simple manner.

The assembly, which is further put forward and which in particular may be a vehicle seat assembly or a door module assembly, comprises a storage compartment of the type which is described above, wherein the carrier panel is a moulded part of the assembly, thus for example a structural or decorative element on the outer side of the assembly, for example a cover or a trim part.

BRIEF DESCRIPTION OF THE FIGURES

The suggested storage compartment and the suggested assembly are hereinafter explained in more detail by way of exemplary embodiments, wherein the attached figures are to contribute to a better understanding of the exemplary embodiments together with their aforementioned and other advantages. Each of the following schematically shows.

DETAILED DESCRIPTION

Figure 1:
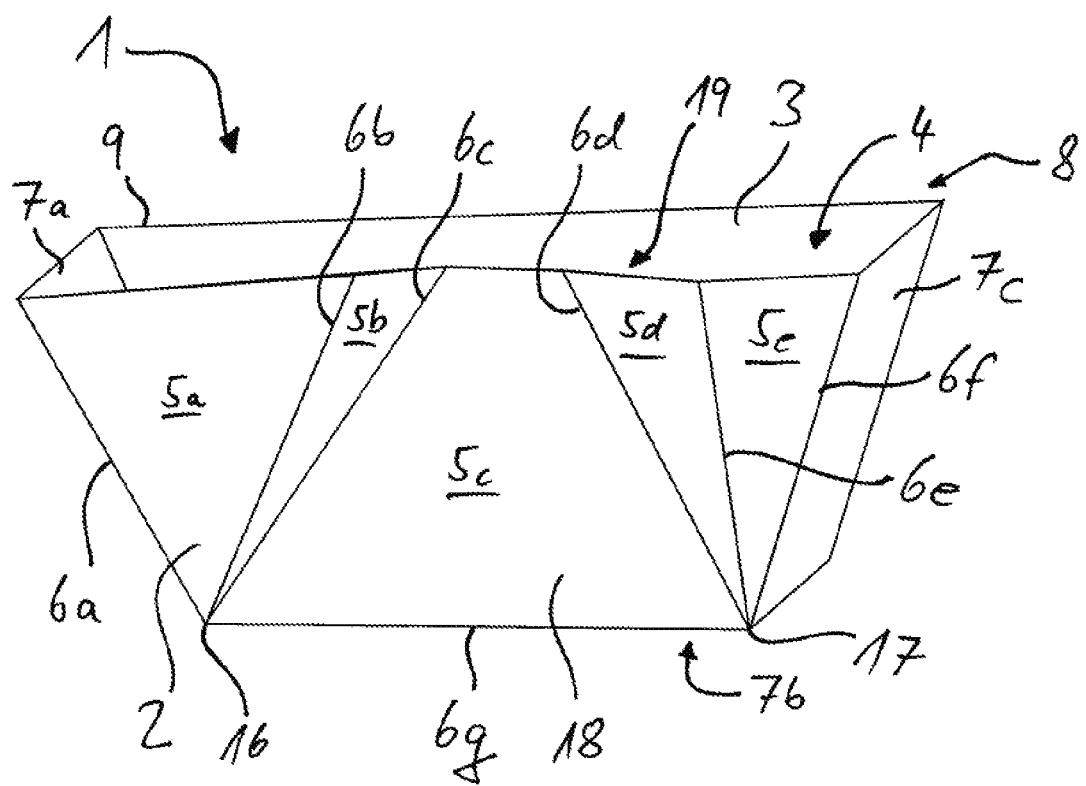
FIG. 1 a storage compartment according to a first exemplary embodiment.

Recurring and similar features of different embodiments are provided with identical reference numerals in the drawings, wherein reference numerals of already previously shown features may be omitted. Likewise, the mentioning of already described features may be omitted on describing further figures.

The storage compartment 1 shown in FIG. 1 comprises a cover flap 2, which is connected to a carrier panel 3 such that a storage space 4 can be formed between the carrier panel 3 and the cover flap 2.

The cover flap 2 comprises a plurality of segments (specifically five segments) 5a, 5b, 5c, 5d, 5e. Another number of segments may be provided alternatively to this.

The cover flap 2 is connected to the carrier panel 3 along several outer edges of the cover flap 2 by way of several support elements 7a, 7b, 7c, for forming the storage space 4, wherein an opening 8 for introducing or removing objects to be stowed remains in the region of an outer edge of the cover flap 2. The cover flap 2 at its edge is spaced apart from the carrier panel 3 by the support elements 7a, 7b, 7c.

The support elements 7a, 7b, 7c of the carrier panel 3 and the segments 5a, 5b, 5c, 5d, 5e are connected to one another in the following manner: the support element 7a, an edge which is spaced apart from the carrier panel 3, is adjacent to a first edge of the segment 5a and is pivotably connected to said segment about a first axis 6a. The segment 5a, at a second edge, is adjacent to a first edge of the segment 5b and is pivotably connected to said segment about a second axis 6b. The segment 5b, at a second edge, is adjacent to the segment 5c and is pivotably connected to said segment about a third axis 6c. The segment 5c, at a second edge, is adjacent to a first edge of the panel 5d and is pivotably connected to said segment about fourth axis 6d. The segment 5d, at a second edge, is adjacent to a first edge of the segment 5e and is pivotably connected to said segment about a fifth axis 6e. The segment 5e, at a second edge, is adjacent to an edge of the support element 7c which is spaced apart from the carrier panel 3 and is pivotably connected to said support element about a sixth axis 6f. Furthermore, the segment 5c, at a third edge, is adjacent to an edge of the carrier panel 7b which is spaced apart from the carrier panel 3 and is pivotably connected to the carrier panel about a seventh axis 6g. The segment 5c may also be directly connected to the carrier panel 3 in a pivotable manner about the seventh axis 6g.

Hence each of the segments 5a, 5b, 5c, 5d, 5e is movably connected to at least one further one of the segments 5a, 5b, 5c, 5d, 5e and/or to the carrier panel 3 about a respective axis 6a, 6b, 6c, 6d, 6e, 6f, 6g, wherein the axes 6a, 6b, 6c, 6d, 6e, 6f, 6g are pivot axes.

The cover flap 2, by way of pivoting the segments 5a, 5b, 5c, 5d, 5e is movable between a stable first position and a stable second position in which the storage space 4 is enlarged compared to the first position.

Figure 2A:
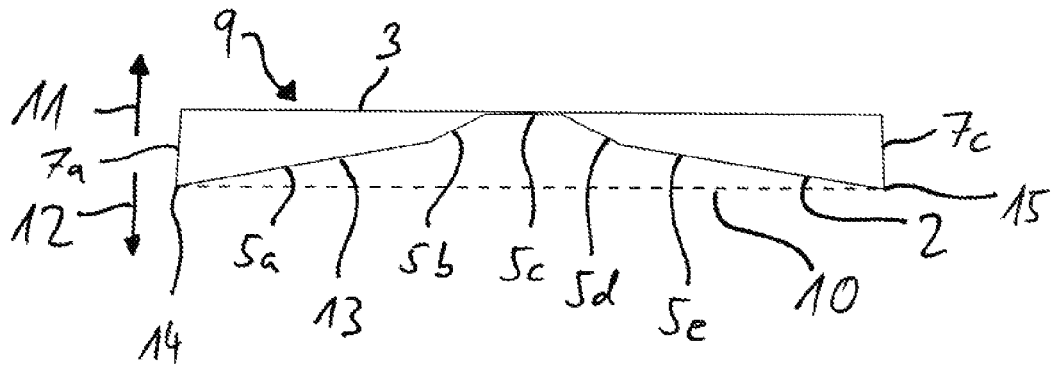
FIG. 2a a part of the storage compartment according to FIG. 1 in a first position, FIG. 2b a part of the storage compartment according to FIG. 1 in a second position, FIG. 2c a part of the storage compartment according to FIG. 1 in a third position, FIG. 3 an exemplary assembly with a storage compartment according to a second exemplary embodiment, FIG. 4 a further exemplary assembly with a storage compartment according to a third exemplary embodiment, FIG. 5a a cross-sectional representation of a joint element between two segments, FIG. 5b a cross-sectional representation of an alternative joint element which connects two segments, FIG. 5c a cross-sectional representation of a further joint element.
Figure 2B:
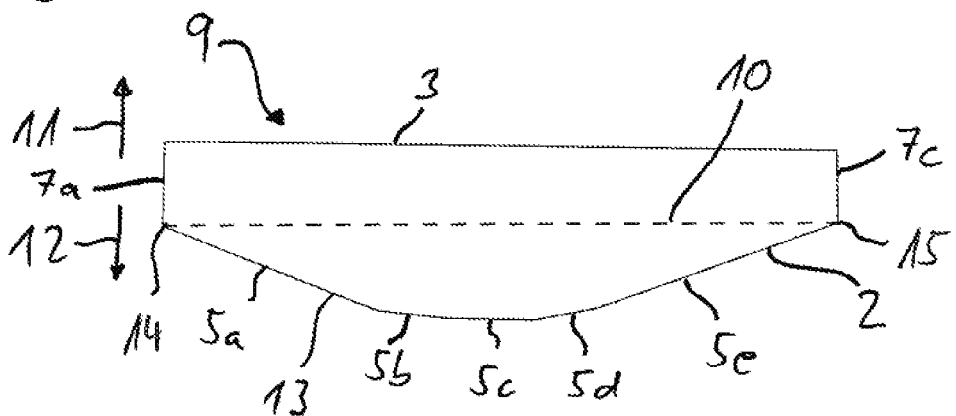
Figure 2C:
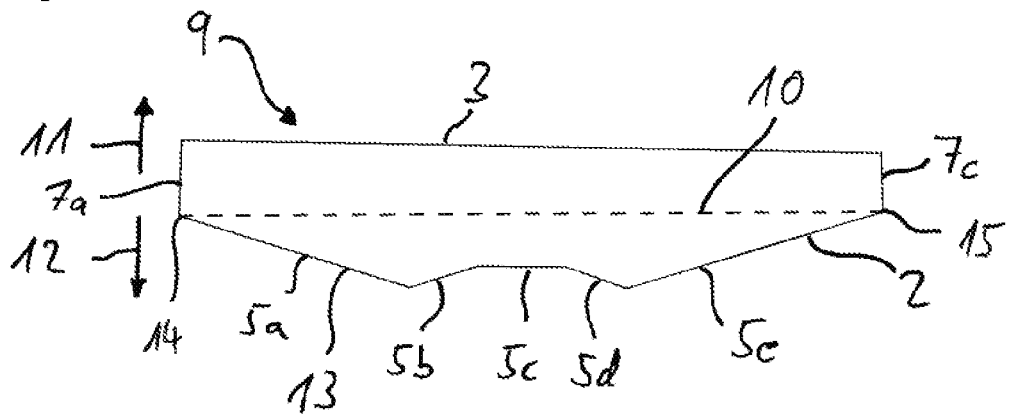

In FIG. 2a, FIG. 2b, and FIG. 2c, an opening contour line 9 of the opening 8 is shown in a plan view for clarifying the different positions of the cover flap 2, wherein the remaining parts of the storage compartment 1 are not shown for reasons of a better overview.

FIG. 2a shows an opening contour line 9, wherein the cover flap 2 is in the first position. Edges of the cover flap 2 which are connected to the carrier panel 3 define a middle plane 10. The cover flap 2 in the first position is deflected out of the middle plane 10 in a first direction 11 which is perpendicular to the middle plane 10.

The cover flap comprises an outer contour line 13 (measured as a contour line of the cover flap between points 14 and 15), which is longer than a projection of the contour line onto the middle plane (here: shortest length between the points 14 and 15 along the middle plane). The additional length of the contour line 13 is accommodated by degrees of freedom of the segments 5a, 5b, 5c, 5d, 5e on pivoting about the axes 6a, 6b, 6c, 6d, 6e, 6f, 6g on moving the cover flap 2 through the middle plane 10.

FIG. 2b shows the opening contour line 9, wherein the cover flap 2 is in the second position. The cover flap 2 in the second position is deflected out of the middle plane 10 in a second direction 12 which is opposite to the first direction 11.

FIG. 2c shows the opening contour line 9, wherein the cover flap 2 is in an instable third position. In the shown third position, the cover flap 2 is subjected to a force in the direction of the second position.

The shown third position lies closer to the first position than a (not shown) intermediate position. The intermediate position is a position at which the force which acts upon the cover flap 2 reverses in the following manner: if the third position lies closer to the first position than the intermediate position, then the cover flap is subjected to a force in the direction of the first position. If, in contrast, the third position lies closer to the second position than the intermediate position or if the third position corresponds to the intermediate position (or the cover flap 2 by way of applying an external force is moved out of the shown third position further in the direction of the second position until reaching or exceeding the intermediate position), then the cover flap 2 is subjected to a force in the direction of the second position. The cover flap 2 is therefore bistable.

Reference to FIG. 1 is made again hereinafter. The segments 5a, 5b, 5c, 5d, 5e are essentially flat and planar elements and are arranged in an adjacent manner within the cover flap 2, bordering one another at respective neighbouring edges. Alternatively, an additional material section may be provided between two segments, so that these may be spaced apart from one another.

Figure 5A:
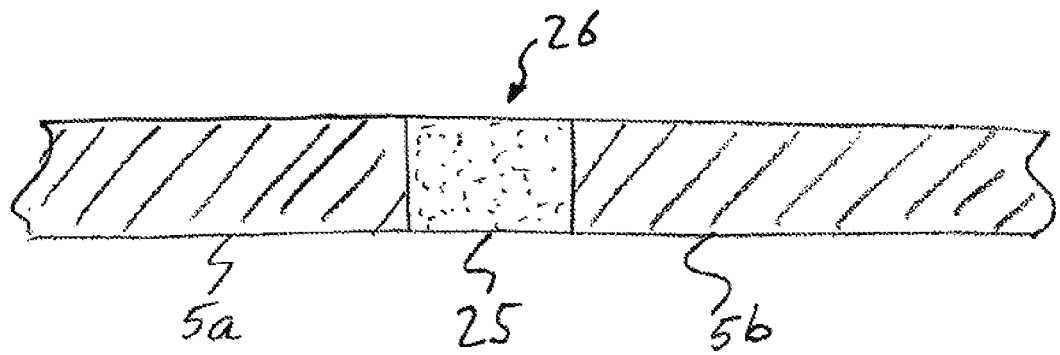

In a first embodiment, the cover flap 2 comprises stiff and/or rigid segments which are connected to one another by way of flexible joint elements which are arranged between the segments. As is shown in FIG. 5a for segments 5a and 5b and a joint element 25, the material of the joint element 25 fills a gap 26 between the two segments 5a and 5b. Alternatively, the gap may 26 also be only partly filled, wherein the joint element 25 has a lower thickness than the segments 5a, 5b. In this embodiment, the joint elements 25 and the segments are preferably manufactured of different materials, wherein the joint elements 25 are more flexible than the segments and comprise for example silicone, rubber or polyurethane. The segments may be manufactured for example from polypropylene or a fibre composite material.

A biasing with a preferred angle of 180° is achieved for example by way of the gap 26 between two adjacent segments being filled when the segments lie flat next to one another. Alternative preferred angles can be achieved by way of the segments having another angle to one another during the filling of the gap 26.

Figure 5B:
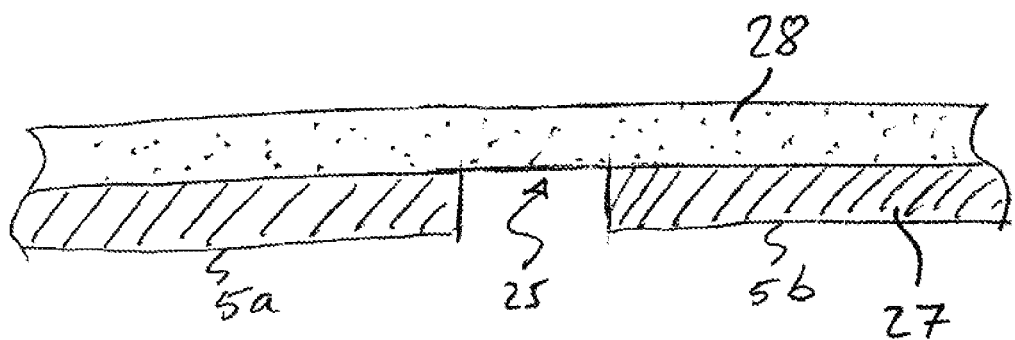

In a second embodiment, as is shown in FIG. 5b, the cover flap 2 comprises a first layer 27 and a second layer 28, which may be shaped and joined together for example by way of a multi-component injection moulding process, wherein the second layer 28 may be manufacturable in a first process cycle and the first layer 27 in a second process cycle. Alternatively, the two layers 27, 28 are laminated onto one another. Laminating is preferred if one of the two layers 27, 28 does not consist of an injection moulding material, but for example of leather, artificial leather, textile or veneer.

The cover flap 2 which is shown in FIG. 1 may comprise a first and a second polymer layer, wherein the first polymer layer consists of an essentially rigid, in particular flexurally rigid material, for example of a fibre composite material. The first polymer layer is arranged on a front side 18 of the cover flap 2 which faces away from the carrier panel 3, and the second layer 28 is arranged on a side 19 of the cover flap 2 which faces the carrier panel 3.

Optionally, a decorative material may additionally be deposited onto the first polymer layer at the front side 18 (and possibly onto the second polymer layer at the rear side 18), for instance polymer, textile, leather or artificial leather. The second polymer layer consists of a flexible, elastic material, for example silicone or polyurethane.

The first polymer layer is segmented and thereby forms the segments 5a, 5b, 5c, 5d, 5e. The second polymer layer is designed in a continuous, i.e. non-segmented manner, and therefore connects the segments 5a, 5b, 5c, 5d, 5e to one another and is additionally designed somewhat larger and projecting beyond the segments and with the part which projects beyond the segments is fastened to the support elements 7a, 7b, 7c. Alternatively, the second polymer layer may be segmented and the first polymer layer may be continuous, in particular if a decorative material is deposited on the front side of the cover flap.

In regions between the segments 5a, 5b, 5c, 5d, 5e amongst one another as well as between the segments 5a, 5b, 5c, 5d, 5e and the support elements 7a, 7b, 7c, the bendable and elastic second polymer layer acts as a plurality of elastically biased joint elements for exerting the force in the direction of the first and/or second position—or more precisely: film hinges—by way of whose bending degrees of freedom the axes 6a, 6b, 6c, 6d, 6e, 6f, 6g are formed, wherein the axes 6a, 6b, 6c, 6d, 6e, 6f, 6g are arranged parallel to edges of adjacent segments.

Each of the thus formed joint elements is therefore connected to two adjacent segments 5a, 5b, 5c, 5d, 5e or to one of the segments 5a, 5b, 5c, 5d, 5e and—by way of the support elements 7a, 7b, 7c—to the carrier panel 3.

Figure 5C:

Alternatively to the mentioned design with two polymer layers which may be manufacturable by way of a multi-component injection moulding method, the storage compartment 1 or the cover flap 2 may also be constructed differently, for example by way of a regular single-component injection moulding method, wherein the joint elements 25 may be designed for example as regions which are thinned compared to the segments (film hinges), as is shown in FIG. 5c. Alternatively, the segments 5a, 5b, 5c, 5d, 5e may comprise for example metal, glass and/or wood or consist of these. The joint elements may alternatively be or comprise pin hinges or rotary hinges which for example may be biased by way of a spring element. The joint elements may also be such film hinges, which can be deposited onto the segments at a later stage, for instance as a bendable polymer player, rubber layer and/or metal layer.

The segments 5a, 5b, 5d, 5e each have a triangular shape, the segment 5c a trapezoidal shape. The axes 6a, 6b and 6c which are arranged between edges of the segments 5a, 5b and 5c intersect at a common point 16. The axes which are arranged between edges of the segments 5c, 5d, and 5e intersect at a common point 17. The shown shape and arrangement of the segments 5a, 5b, 5c, 5d, 5e and of the axes 6a, 6b, 6c, 6d, 6e, 6f, 6g is one possibility of providing that on moving the cover flap 2 through the middle plane 10, the additional length of the contour line 13 is accommodated by the degrees of freedom of the segments 5a, 5b, 5c, 5d, 5e on pivoting about the axes 6a, 6b, 6c, 6d, 6e, 6f, 6g.

Alternatively, shapes of the segments 5a, 5b, 5c, 5d, 5e of the cover flap 2 as well as arrangements of the axes 6a, 6b, 6c, 6d, 6e, 6f, 6g other than those which are shown in the figures are possible, for instance one or more of the segments may be rectangular, square, polygonal or partly polygonal and/or comprise rounded and/or freely shaped regions.

The joint elements are biased in the direction of a preferred angle of 180° by way of the design as elastic film hinges. A preferred angle of 180° means that two flat segments lie next to one another in a plane. By way of this, the force in the direction of the first position or in the direction of the second position is provided in the third position and hence the bistability of the cover flap 2 is achieved.

A preferred angle (of 180° or another angle) may also be achieved in another manner, for example by way of hinges which are biased by way of spring elements or hinges with a shape memory material.

Figure 3:
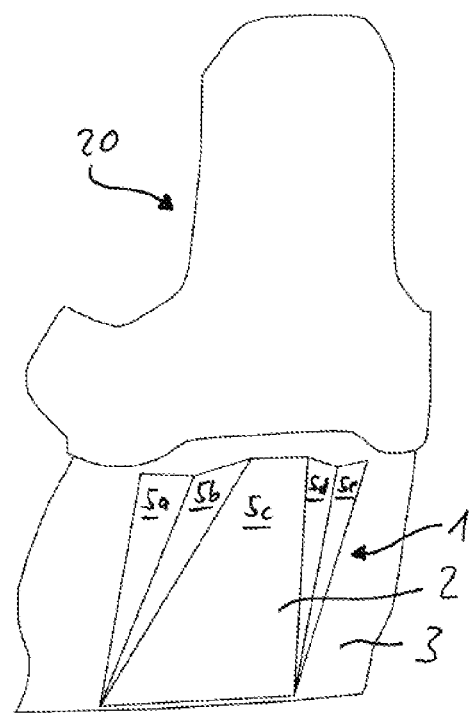

The assembly 20 which is shown in FIG. 3 is a casing (shell) part for a vehicle seat, wherein a shell element forms the carrier panel 3, on which the cover flap 2 with the segments 5a, 5b, 5c, 5d, 5e is attached for forming the storage compartment 1 (i.e. without support elements). The shape of the storage compartment 1 according to the second exemplary embodiment which is shown here is otherwise similar to the first exemplary embodiment which is described above. The storage compartment is located for example at the rear side of a front seat and may be easily reached by an occupant seated at the rear.

Figure 4:
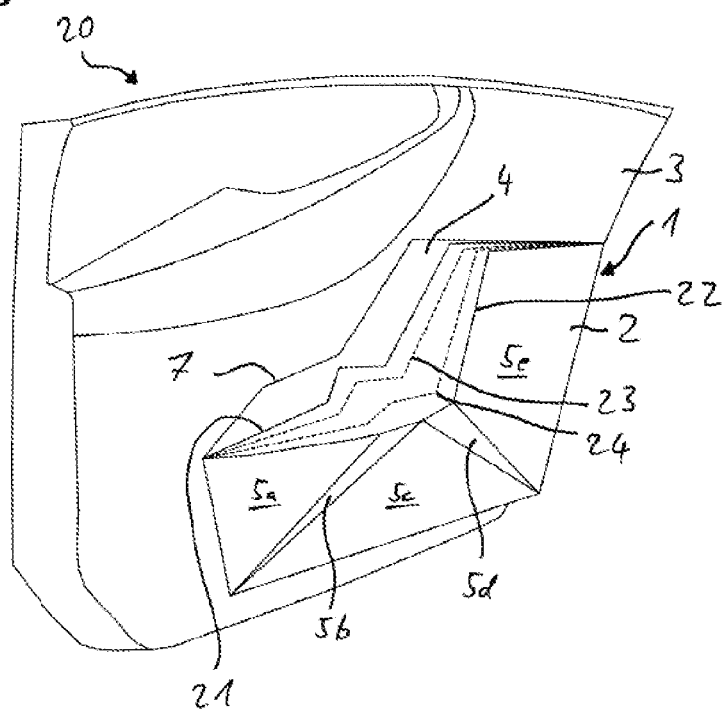

Another exemplary form of the storage compartment 1 in the fashion of the third exemplary embodiment is shown in FIG. 4. Here, the storage compartment 1 is a part of an assembly 20 which is part of a door module, wherein the carrier panel 3 is formed by a moulded part of the door module. Differently to the first and second exemplary embodiment, the storage compartment 1 here is not shaped in a symmetrical manner, but asymmetrically and is therefore adapted to the shape of the moulded part of the door module. The storage space 4 is embedded into a recess of the moulded part, on whose edge, which serves as a support element 7, the cover flap 2 is attached with the segments 5a, 5b, 5c, 5d, 5e. Lines 21, 22, 23, 24 indicate different positions of the cover flap 2: line 21 corresponds to the first position, line 22 to the second position, line 23 to the third position, in which the cover flap 2 experiences a force in the first position, and line 24 corresponds to a third position, in which the cover flap 2 experiences a force in the direction of the second position.

LIST OF REFERENCE NUMERALS 1 storage compartment
2 cover flap
3 carrier panel
4 storage space
5a, 5b, 5c, 5d, 5e segment
6a, 6b, 6c, 6d, 6e, 6f, 6g axis
7, 7a, 7b, 7c support element
8 opening
9 opening contour line
10 middle plane
11 first direction
12 second direction
13 contour line
14, 15, 16, 17 point
18 front side
19 rear side
20 assembly
21, 22, 23, 24 line
25 joint element
26 gap
27 first layer
28 second layer

What is claimed is:

1. A storage compartment for a vehicle, comprising:
a cover flap connected to a carrier panel to form a storage space between the carrier panel and the cover flap, wherein the cover flap includes at least two segments, wherein each of the segments is connected to at least one other of the segments movably about a respective axis, wherein the cover flap is movable, by pivoting the segments, between a stable first position and a stable second position, in which the storage space is enlarged compared to the first position, wherein the cover flap does not move out of the stable first position or the stable second position in the absence of an external force action and wherein when the cover flap assumes an unstable third position between the first position and the second position, the cover flap is subjected to a force in at least one of: a direction of the first position or in a direction of the second position, and wherein at least three axes intersect at a common point; and
a joint element, which is at least one of elastically biasable or biased for exerting the force in the direction of the first position and in the direction of the second position, wherein the joint element is connected to at least one of the segments and is movable about one of the respective axes.

2. The storage compartment according to claim 1, wherein the joint element is at least one of: biasable or biased in the direction of an angle between adjacent segments.

3. The storage compartment according to claim 2, wherein the angle is 180°.

4. The storage compartment according to claim 1, wherein the joint element is a film hinge.

5. The storage compartment according to claim 1, wherein the cover flap comprises at least five segments.

6. The storage compartment according to claim 5, wherein a first set of at least three axes intersects at a first common point and a second set of at least three axes intersects at a second common point.

7. The storage compartment according to claim 1, wherein at least one of the segments comprises a rigid material.

8. The storage compartment according to claim 1, wherein the cover flap is connected to the carrier panel by way of one or more support elements and is spaced apart from the carrier panel at least in the second position.

9. The storage compartment according to claim 1, wherein one or more edges of the cover flap which are connected to the carrier panel define a middle plane and the cover flap, in the first position, is deflected out of the middle plane in a first direction perpendicular to the middle plane and, in the second position, is deflected out of the middle plane in a second direction which is opposite to the first direction.

10. The storage compartment according to claim 1, wherein at least one of the storage compartment or the cover flap can be manufactured at least partly by way of a multi-component injection moulding process, wherein the joint element can be manufactured, at least partly, in at least one of: a first process cycle or of a first material, and the segments can be manufactured, at least partly, in at least one of: a second process cycle or of a second material.

11. An assembly comprising:
a storage compartment comprising:
a cover flap connected to a carrier panel to form a storage space between the carrier panel and the cover flap, wherein the cover flap includes at least two segments, wherein each of the segments is connected to at least one other of the segments movably about a respective axis, wherein the cover flap is movable, by pivoting the segments, between a stable first position and a stable second position, in which the storage space is enlarged compared to the first position, wherein the cover flap does not move out of the stable first position or the stable second position in the absence of an external force action and wherein when the cover flap assumes an unstable third position between the first position and the second position, the cover flap is subjected to a force in at least one of: a direction of the first position or in a direction of the second position, wherein at least three axes intersect at a common point, and a joint element, which is at least one of elastically biasable or biased for exerting the force in the direction of the first position and in the direction of the second position, wherein the joint element is connected to at least one of the segments and is movable about one of the respective axes;

wherein the carrier panel is a moulded part of the assembly.

12. The assembly according to claim 11, wherein the assembly is a vehicle seat assembly.

13. The assembly according to claim 11, wherein the assembly is a door module assembly.

* * * * *